United States Patent [19]

Kardach et al.

[11] Patent Number: 5,664,197
[45] Date of Patent: Sep. 2, 1997

[54] METHOD AND APPARATUS FOR HANDLING BUS MASTER CHANNEL AND DIRECT MEMORY ACCESS (DMA) CHANNEL ACCESS REQUESTS AT AN I/O CONTROLLER

[75] Inventors: James P. Kardach, Saratoga; Sung-Soo Cho, Sunnyvale; Jim S. Cheng, Cupertino; Debra T. Cohen, Sunnyvale; John W. Horigan, Mountain View; Nader Raygani, San Jose; Seyed Yahay Sotoudeh, Santa Clara; David I. Poisner, Folsom; Neil W. Songer, Santa Clara, all of Calif.

[73] Assignee: Intel Corporation, Santa Clara, Calif.

[21] Appl. No.: 426,825

[22] Filed: Apr. 21, 1995

[51] Int. Cl.$^6$ .................................................. G06F 13/00
[52] U.S. Cl. ........................ 395/728; 395/287; 395/842; 395/856
[58] Field of Search ............................ 395/842–848, 395/287, 293, 728, 729, 856, 858

[56] References Cited

U.S. PATENT DOCUMENTS

| | | | |
|---|---|---|---|
| 4,648,029 | 3/1987 | Cooper et al. | 395/293 |
| 4,901,234 | 2/1990 | Heath et al. | 395/860 |
| 5,450,551 | 9/1995 | Amini et al. | 395/299 |
| 5,475,854 | 12/1995 | Thomsen et al. | 395/800 |

*Primary Examiner*—Jack B. Harvey
*Assistant Examiner*—Sumati Lefkowitz
*Attorney, Agent, or Firm*—Blakely, Sokoloff, Taylor & Zafman

[57] ABSTRACT

A computer system that implements a direct memory access (DMA) request passing protocol. The computer system may comprise a Peripheral Component Interconnect (PCI) bus that includes an electrical interface as specified by a PCI Local Bus standard. The PCI bus is coupled to at least one DMA agent and a DMA controller. The DMA agent issues DMA requests to the DMA controller using the electrical interface of the PCI bus. According to one embodiment, a system I/O controller receives the DMA requests and passes them on to the DMA controller, which arbitrates the DMA requests and passes back a grant to the system I/O controller. The system I/O controller uses the electrical interface of the PCI bus to pass the grant to the DMA agent. The same DMA request passing protocol may be implemented in any bus having an electrical interface that specifies a unique request signal line for each bus agent of the bus.

21 Claims, 13 Drawing Sheets

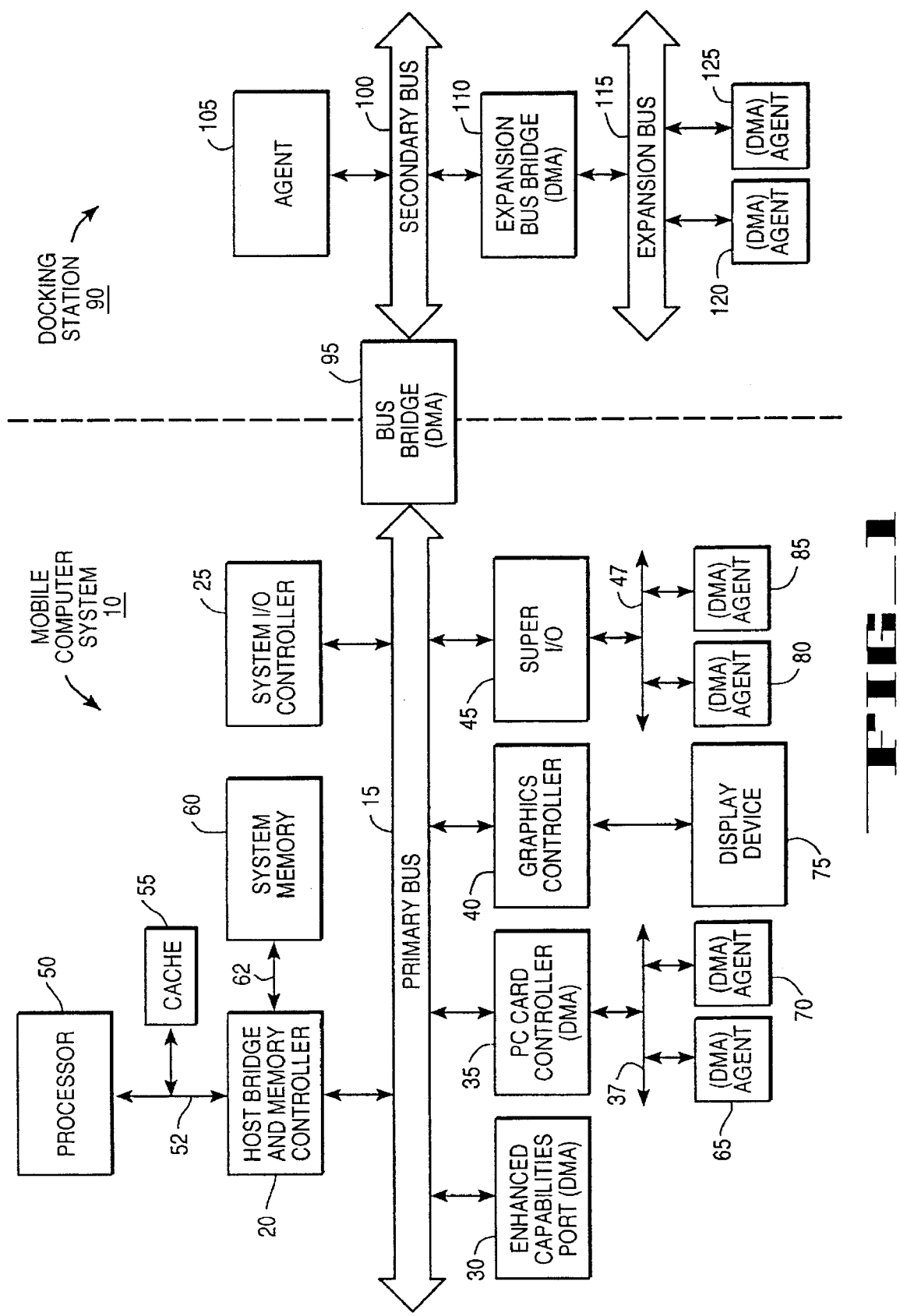

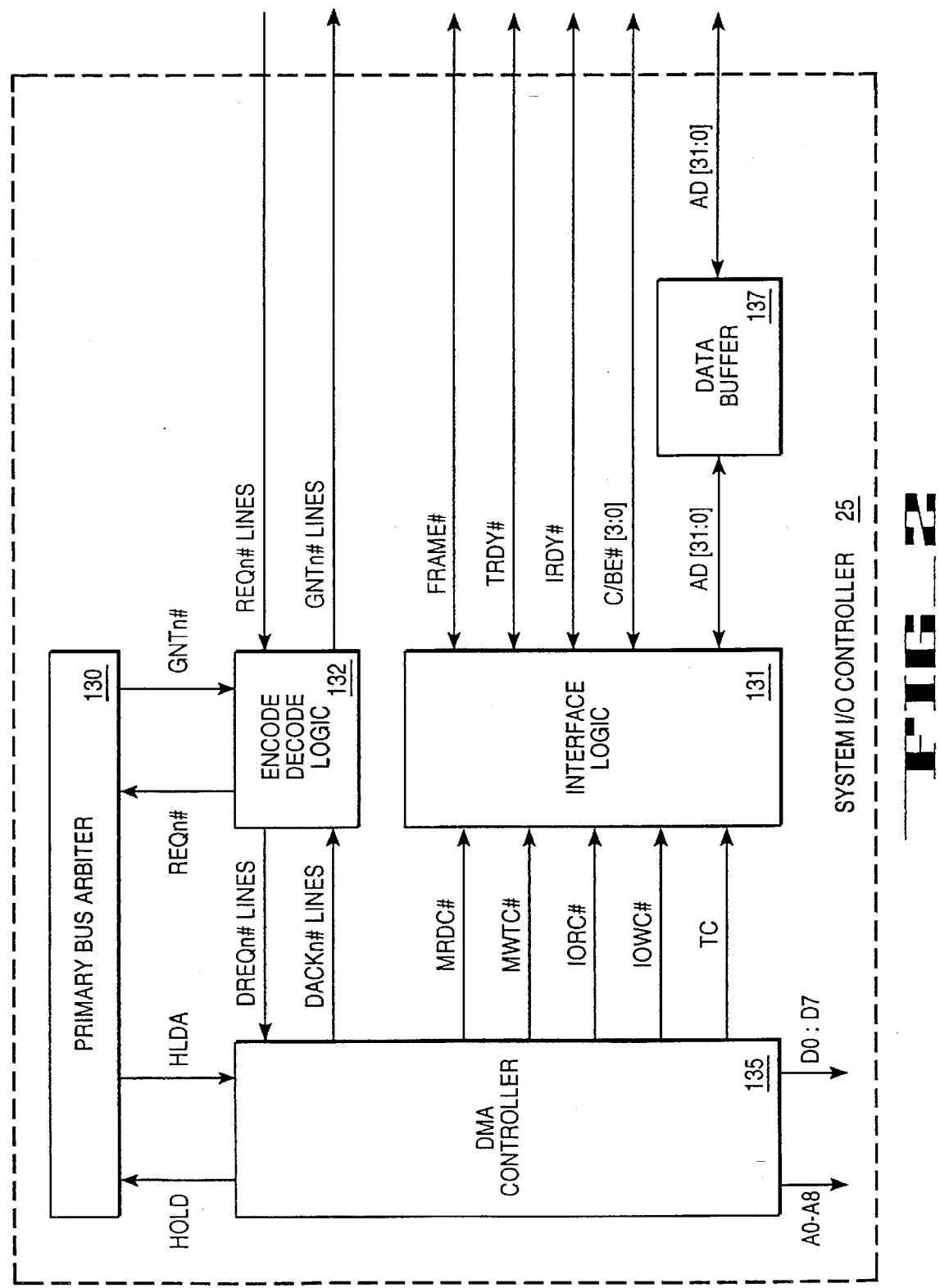

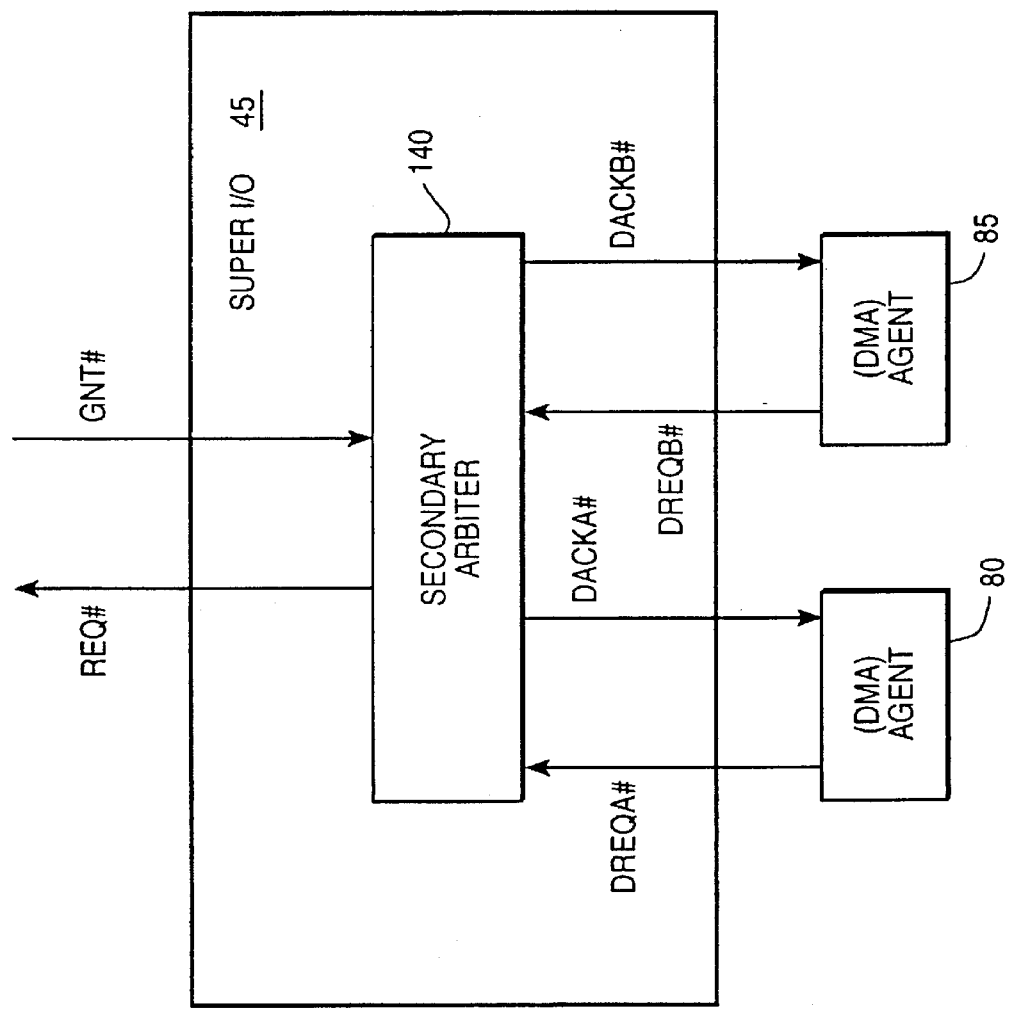

| CHANNEL DECODE | DMA CHANNEL 0 | DMA CHANNEL 1 | DMA CHANNEL 2 | DMA CHANNEL 3 | BUS MASTER | DMA CHANNEL 5 | DMA CHANNEL 6 | DMA CHANNEL 7 | MULTIPLE |
|---|---|---|---|---|---|---|---|---|---|
| 0 | 0 | 1 | 0 | 1 | 0 | 1 | 0 | 1 | X |
| 1 | 0 | 0 | 1 | 1 | 0 | 0 | 1 | 1 | X |
| 2 | 0 | 0 | 0 | 0 | 1 | 1 | 1 | 1 | X |
| 3 | 0 | 0 | 0 | 0 | 0 | 0 | 0 | 0 | 1 |
FIG._5
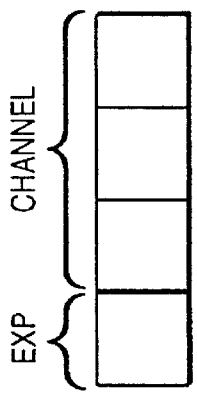
REQ#/GNT# CONTROL REGISTER 145
FIG._4

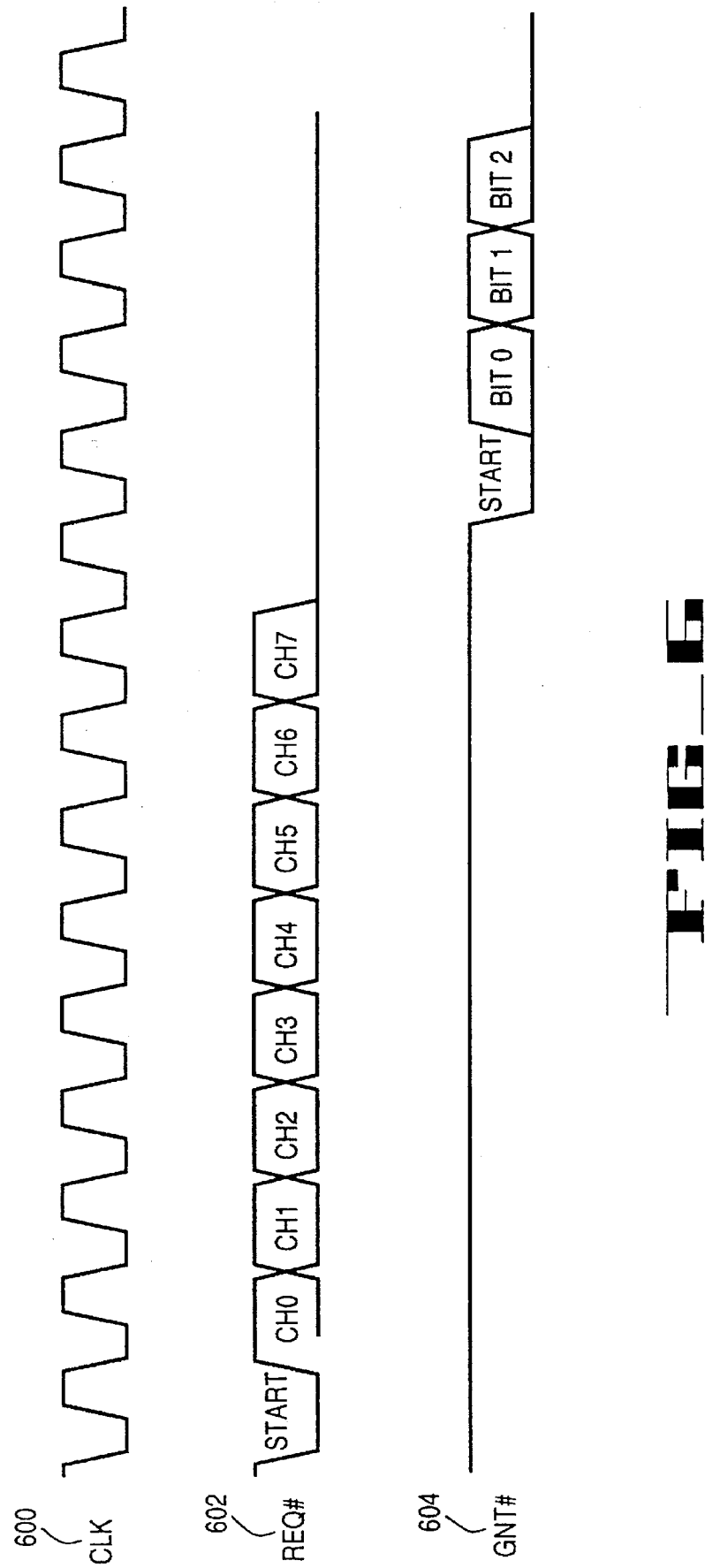
FIG_6

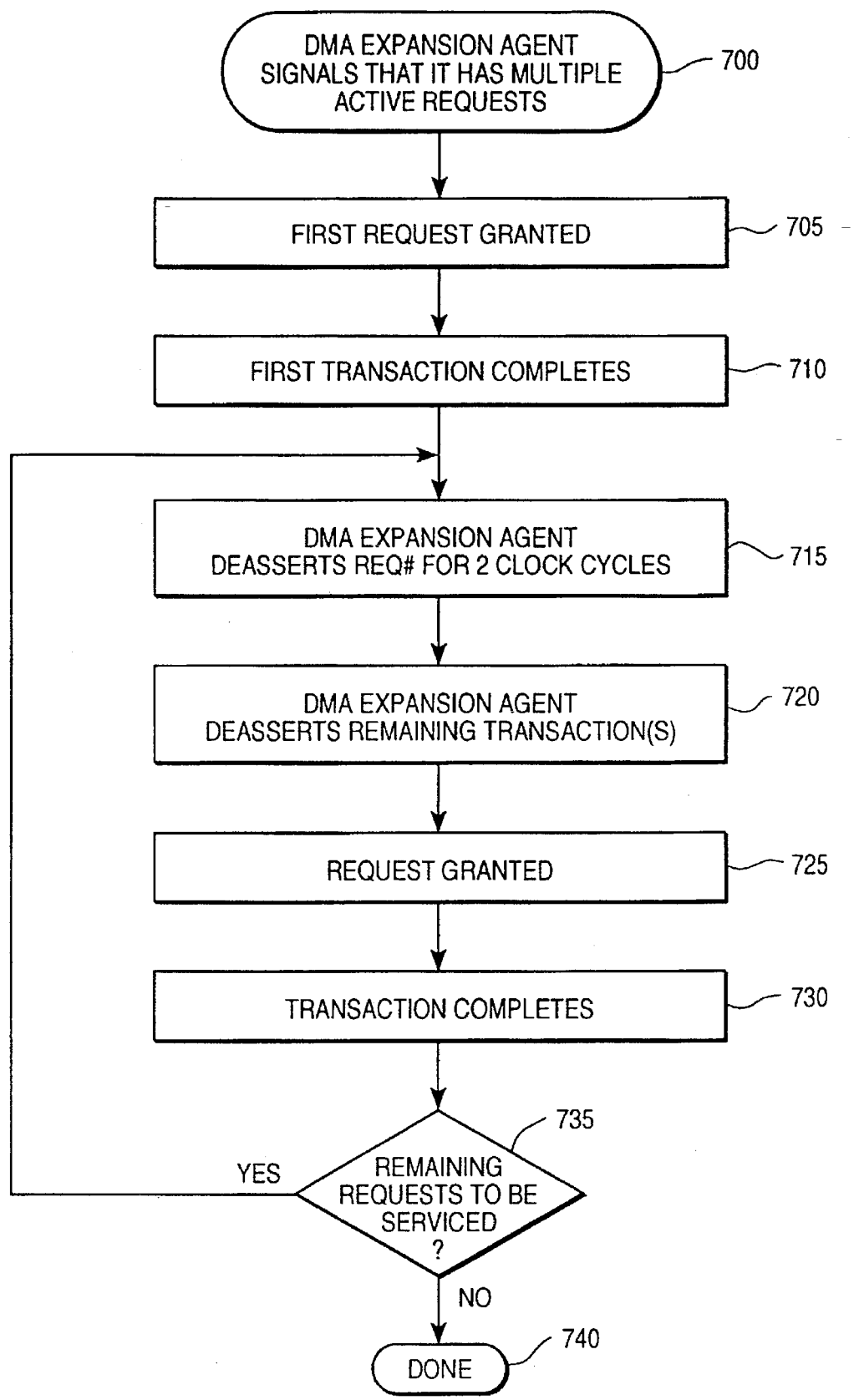
FIG_7

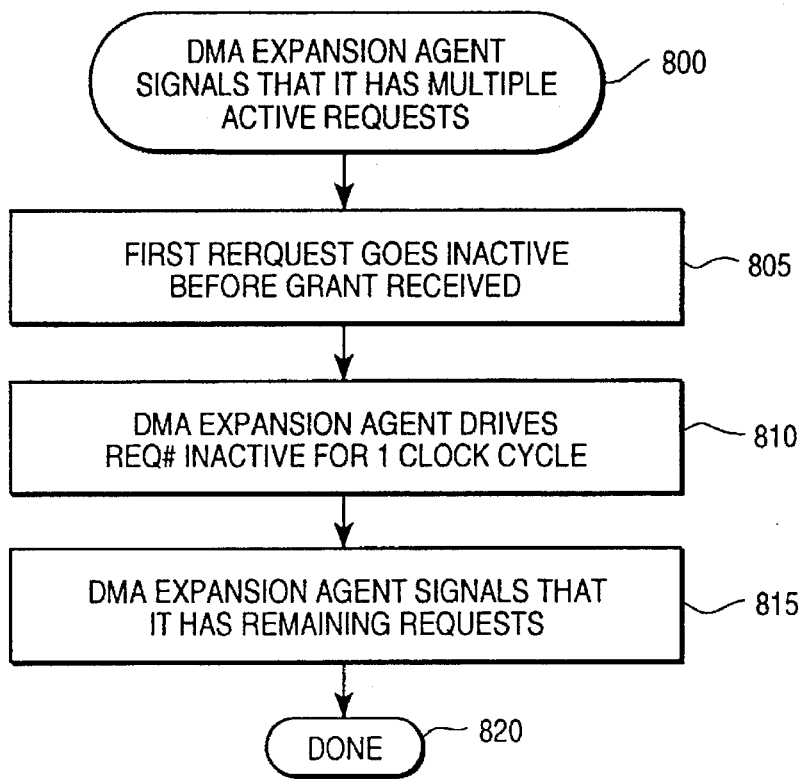
FIG_8
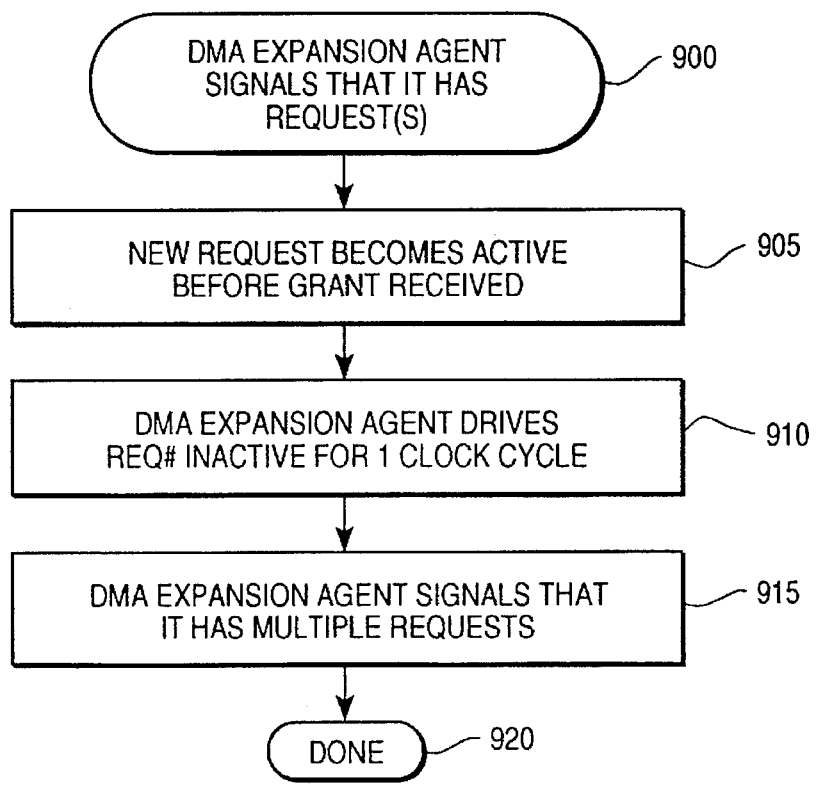
FIG_9

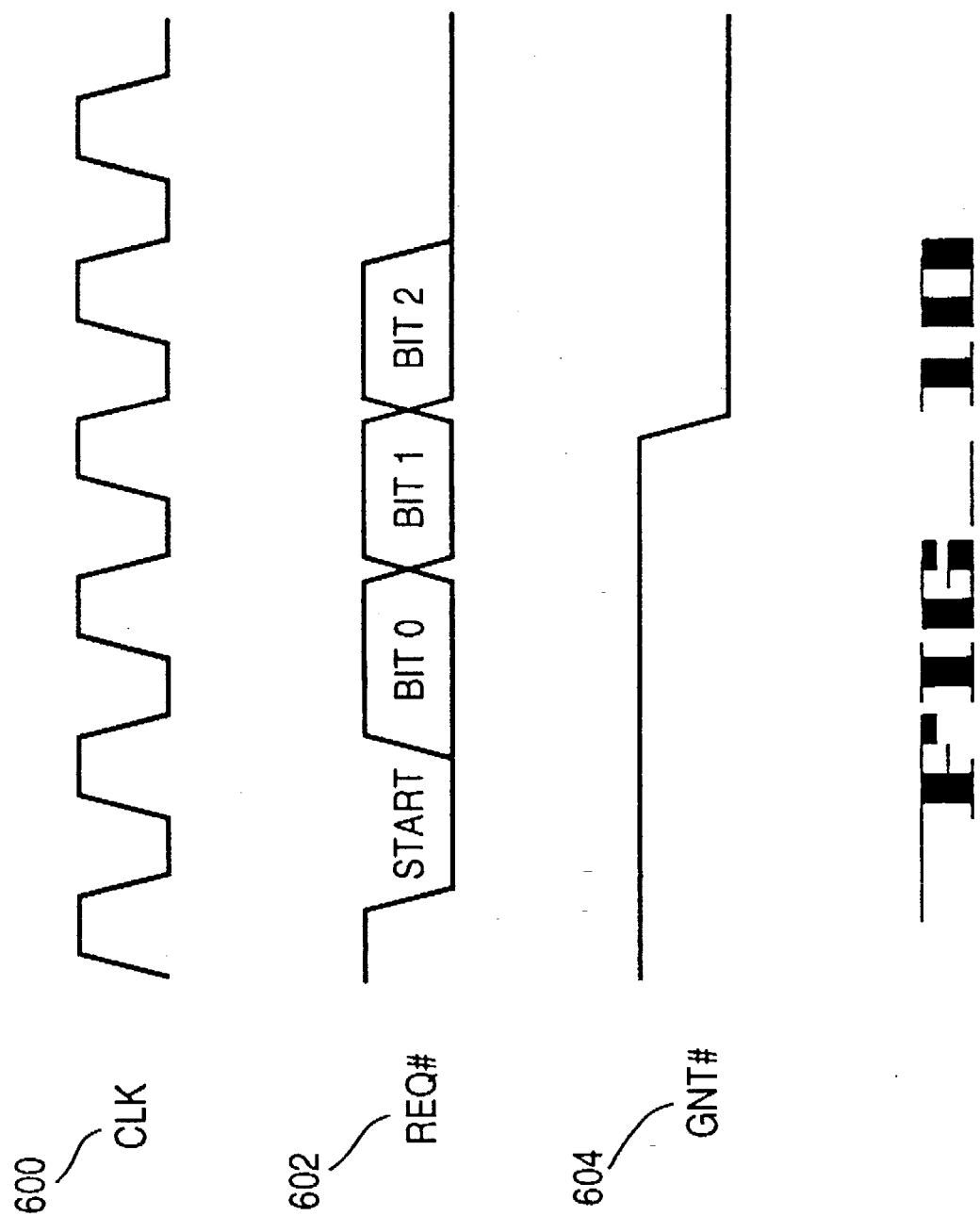

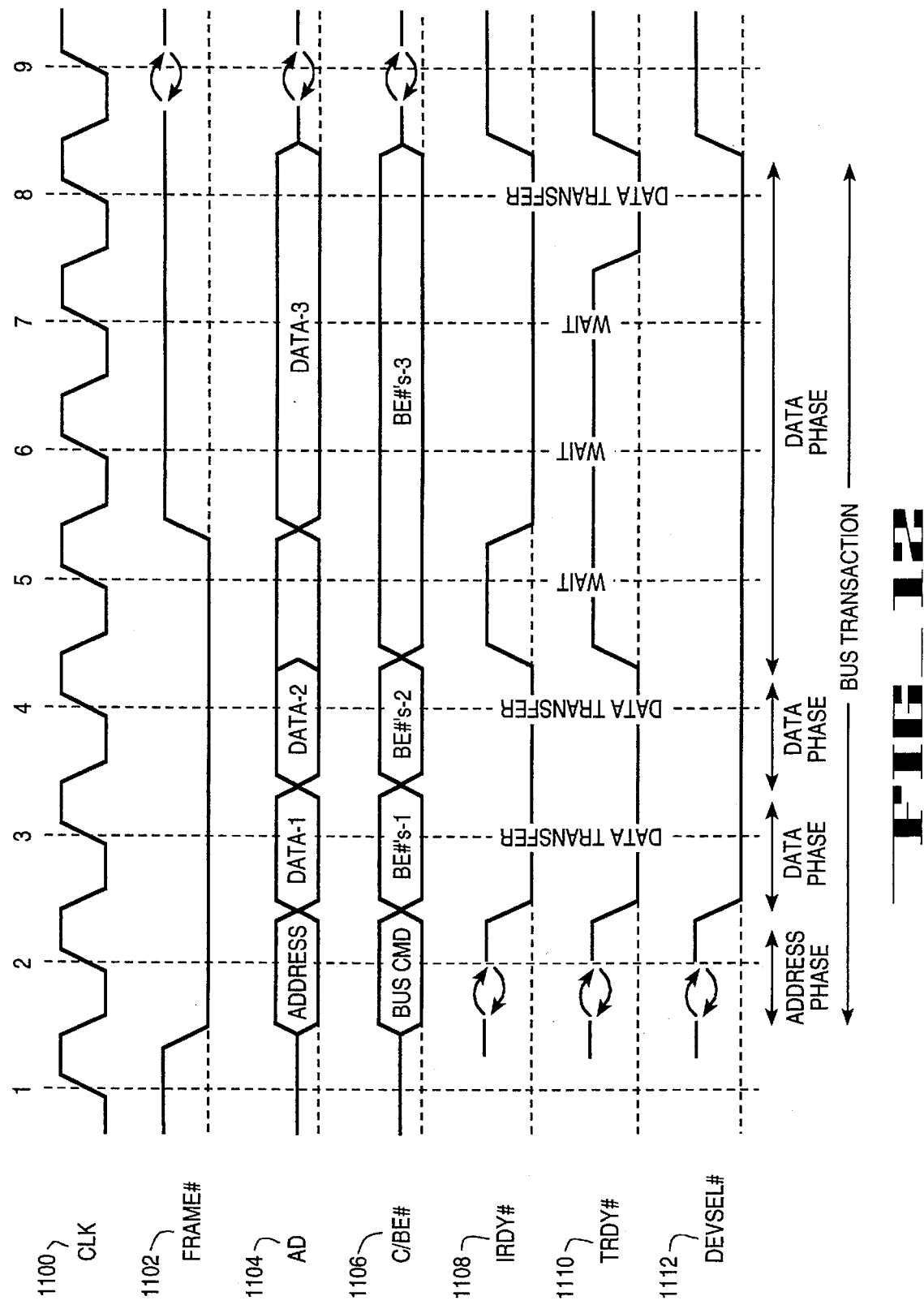

| DMA CYCLE TYPE | DMA I/O ADDRESSES | TC(AD2) | PCI CYCLE TYPE |
|---|---|---|---|
| NORMAL | 00h | 0 | I/O READ WRITE |
| NORMAL TC | 04h | 1 | I/O READ WRITE |
| VERIFY | 0C0h | 0 | I/O READ |
| VERIFY TC | 0C4h | 1 | I/O READ |

FIG_13

| BE#[3:0] | DESCRIPTION |
|---|---|
| 1110b | 8-BIT DMA I/O CYCLE |
| 1100b | 16-BIT DMA I/O CYCLE |
| 0000b | 32-BIT DMA I/O CYCLE |

FIG_15

| DMA AGENT DATA WIDTH | PCI DATA BUS CONNECTION |
|---|---|
| BYTE | AD[7-0] |
| WORD | AD[15-0] |
| DWORD | AD[31-0] |

FIG_14

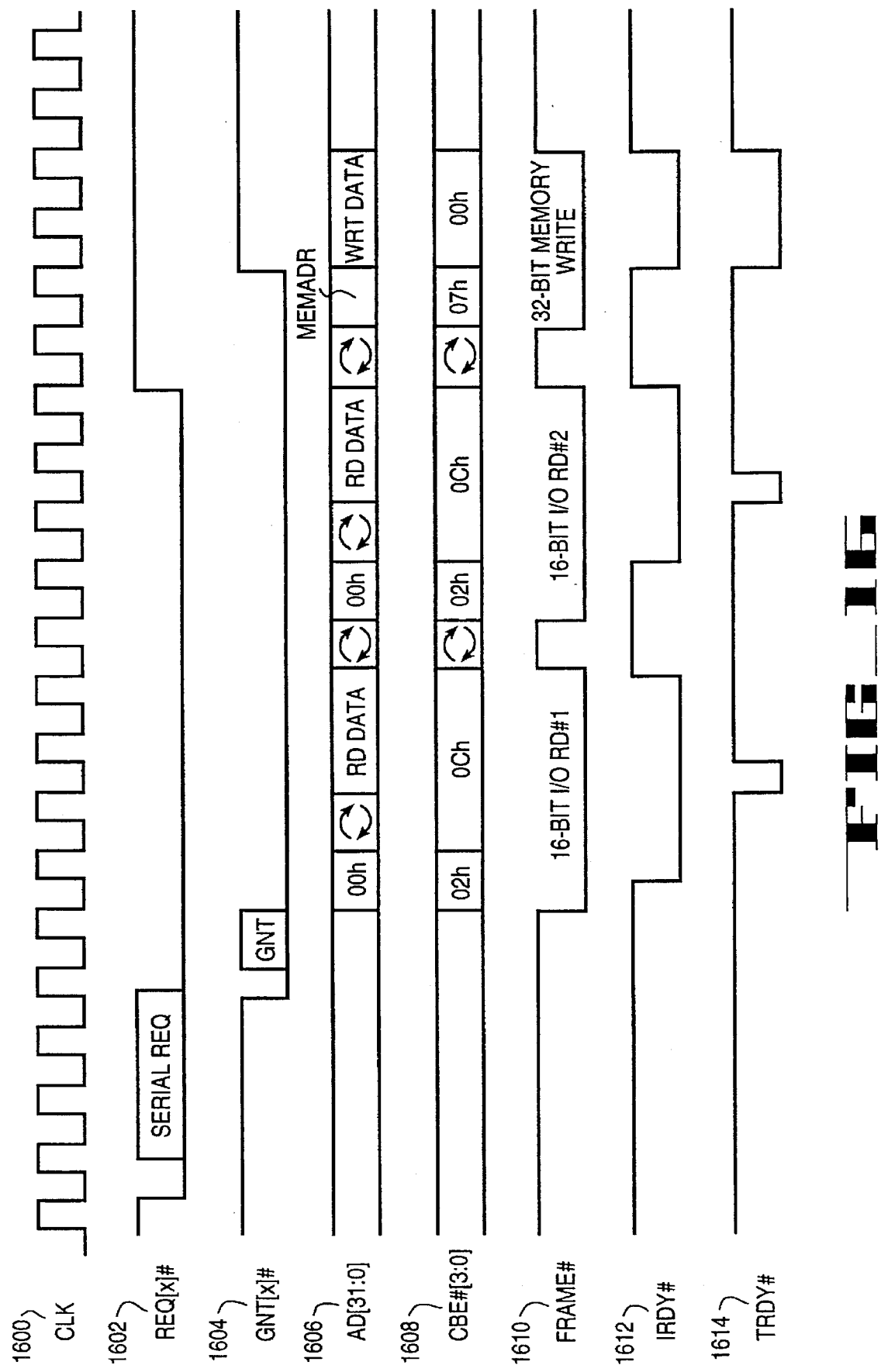
FIG_16

METHOD AND APPARATUS FOR HANDLING BUS MASTER CHANNEL AND DIRECT MEMORY ACCESS (DMA) CHANNEL ACCESS REQUESTS AT AN I/O CONTROLLER

FIELD OF THE INVENTION

The present invention relates to computer bus protocols and more particularly to computer bus protocols for performing direct memory access (DMA) transactions.

BACKGROUND OF THE INVENTION

One widely accepted system architecture for personal computers has been the "AT" system architecture. Prior computer systems incorporating the AT system architecture include system buses that implement either the Industry Standard Architecture (ISA) bus or the Extended Industry Standard Architecture (EISA) bus.

The ISA system architecture provides a Direct Memory Access (DMA) protocol that allows blocks of information to be exchanged between an Input/Output (I/O) device and system memory without unnecessarily tying up the resources of the system processor. Wherein the processor initiates DMA transfers, a DMA controller actually manages DMA transfers. When a DMA transfer is complete, the I/O device produces an interrupt to inform the processor. The EISA system architecture is fully compatible with the ISA DMA protocol, but the EISA system architecture also provides enhanced DMA functions. Both the ISA and EISA system architecture's provide multiple DMA "channels," wherein each DMA channel is assigned to a particular I/O device.

A more recent bus architecture is the Peripheral Component Interconnect (PCI) Local Bus architecture. As described by the *PCI Local Bus Specification*, Revision 2.0 (1993), the PCI Local Bus is a high performance bus that is intended as an interconnect mechanism between highly integrated peripheral controller components, peripheral add-in boards, and processor/memory subsystems.

The PCI Local Bus does not, itself, provide a DMA transfer mechanism. Instead, a computer system that incorporates the PCI Local Bus architecture typically relies on the DMA services of an ISA or EISA bus that is coupled to the PCI Local Bus via a PCI-to-ISA/EISA bus bridge. The bus bridge typically includes a DMA controller that arbitrates DMA requests of local I/O devices coupled to the ISA or EISA bus. Once the DMA controller determines which DMA channel is to be serviced, the bus bridge, as a PCI agent arbitrates for control of the PCI bus to gain access to system memory and initiate the DMA transfer.

Modern personal computer systems, including mobile computer systems such as laptops, are increasingly incorporating the PCI system architecture. Because of size constraints, mobile computer systems that incorporate both the PCI and ISA/EISA architectures typically do not include ISA/EISA expansion slots. To increase the functionality of a mobile computer system in a desktop environment, many mobile computer system manufacturers provide an optional docking station to which the mobile computer system can be coupled via a PCI-to-PCI bus bridge. A docking station may include ISA/EISA expansion slots that allow for ISA/EISA add-in boards, and it would be desirable to provide a mechanism to allow ISA/EISA DMA agents of a docking station to utilize the DMA services of the mobile computer system.

SUMMARY AND OBJECTS OF THE INVENTION

Therefore, an object of the present invention is to provide a mechanism that allows for the arbitration of remote DMA requests.

This and other objects of the invention are provided by a computer system that implements a direct memory access (DMA) request passing protocol. The computer system may comprise a Peripheral Component Interconnect (PCI) bus that includes an electrical interface as specified by a PCI Local Bus standard. The PCI bus is coupled to at least one DMA agent and a DMA controller. The DMA agent issues DMA requests to the DMA controller using the electrical interface of the PCI bus. According to one embodiment, a system I/O controller receives the DMA requests and passes them on to the DMA controller, which arbitrates the DMA requests and passes back a grant to the system I/O controller. The system I/O controller uses the electrical interface of the PCI bus to pass the grant to the DMA agent. The same DMA request passing protocol may be implemented in any bus having an electrical interface that specifies a unique request signal line for each bus agent of the bus.

Other objects, features, and advantages of the present invention will be apparent from the accompanying drawings and from the detailed description which follows below.

BRIEF DESCRIPTION OF THE DRAWINGS

The present invention is illustrated by way of example and not limitation in the figures of the accompanying drawings, in which like references indicate similar elements, and in which:

FIG. 1 shows a computer system according to one embodiment.

FIG. 2 shows a system I/O controller according to one embodiment.

FIG. 3 shows a DMA expansion agent of the primary bus as including a secondary arbiter.

FIG. 4 shows REQ#/GNT# control registers.

FIG. 5 shows a decoding of the values stored by the REQ#/GNT# control registers of FIG. 4.

FIG. 6 is a timing diagram showing a serial channel passing protocol wherein multiple channel requests are passed in single request cycle.

FIG. 7 is a flow chart showing a method for passing multiple requests.

FIG. 8 is a flow chart showing a method for passing multiple requests when a formerly active request becomes inactive.

FIG. 9 is flow chart showing a method for passing multiple requests when a new request becomes active after the DMA expansion agent has previously passed its active requests.

FIG. 10 is a timing diagram showing a serial channel passing protocol wherein a single channel request is passed in single request cycle.

FIG. 12 shows a prior art PCI write transaction.

FIG. 13 shows the encoding of control information during the I/O phase of a DMA transfer according to one embodiment.

FIG. 14 shows the byte alignment of DMA agents according to one embodiment.

FIG. 15 shows the encoding of the byte enable lines when DMA agents are aligned as shown in FIG. 14.

FIG. 16 shows a complete DMA write transfer according to one embodiment.

DETAILED DESCRIPTION

Figure 11:
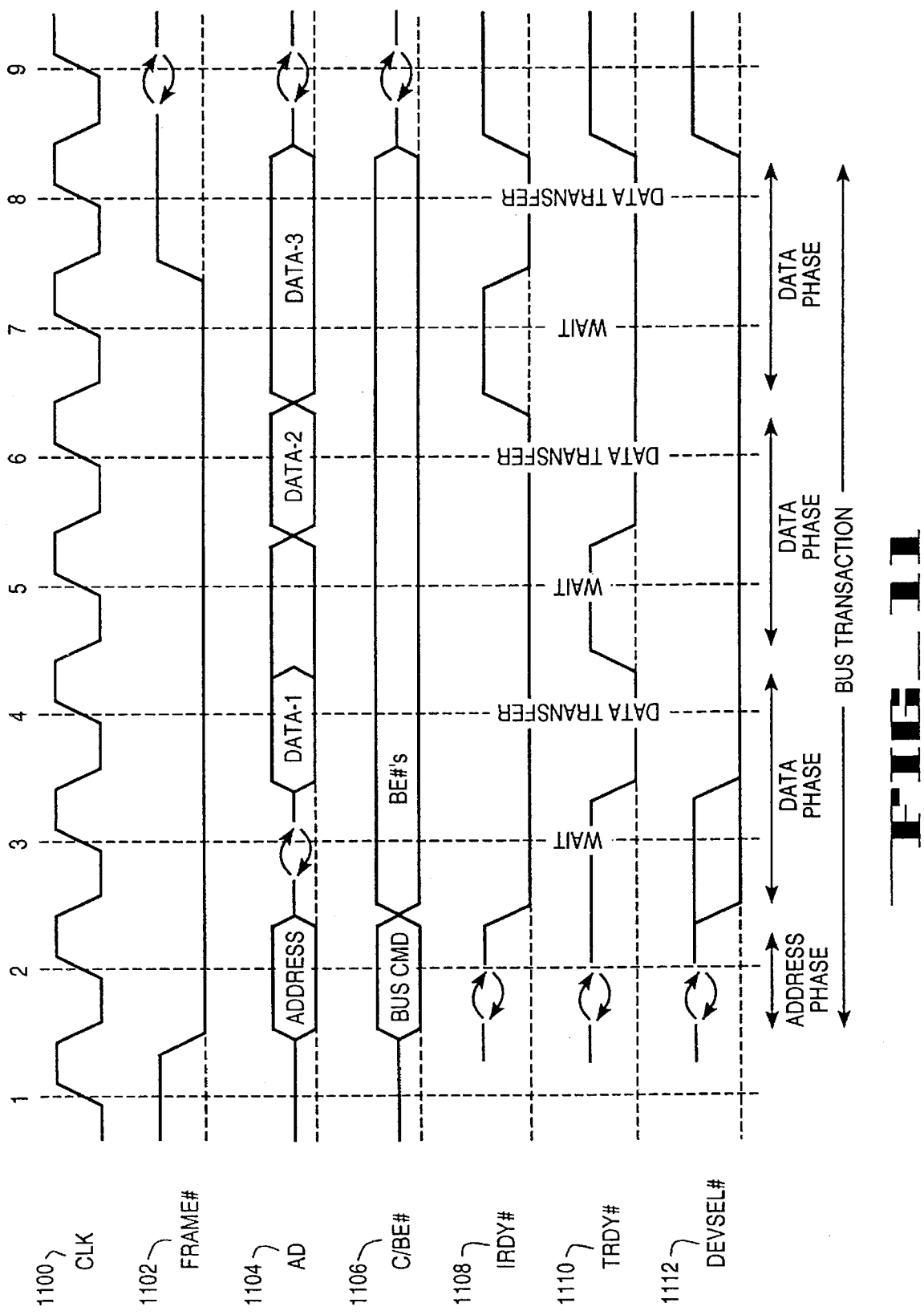
FIG. 11 shows a prior art PCI read transaction.

As described herein, DMA services are provided for the bus agents of a primary bus, and the DMA protocols described below may be implemented by a primary bus that operates according to the PCI Local Bus standard (revision 1.0 or later) without requiring changes to the electrical interfaces of the bus agents or the primary bus. The primary bus includes a system I/O controller to which are coupled a set of request signal lines and a set of grant signal lines, wherein each request signal line and each grant signal line is coupled to a corresponding one of the bus agents.

To request a DMA access, a bus agent simply asserts its request signal line in the appropriate manner. For example, a bus agent may assert and deassert its request line over multiple clock cycles to indicate the DMA channel or channels that it is requesting. Alternatively, the system I/O controller may be configured to recognize any request of a particular bus agent as necessarily being a DMA request. DMA requests are passed to a DMA controller that arbitrates the DMA requests. Non-DMA requests are passed to a primary bus arbiter. The DMA controller grants a DMA channel to a requesting bus agent, and this grant is passed to the requesting agent by the system I/O controller, which indicates a grant of a DMA request by appropriately asserting the correct grant signal line.

When a DMA request is granted, the DMA controller becomes the bus master of the primary bus and controls the DMA transfer between system memory and the requesting bus agent. Each DMA write or read transfer includes an I/O phase, wherein data is read from or written to a bus agent, and a memory phase, wherein data is written to or read from system memory. During the I/O phase of a DMA transfer, the DMA controller uses the address lines of the primary bus to transfer codes to the bus agent that indicate the type of DMA transfer that is to occur. The value of the codes are chosen to correspond to the address space of the DMA controller to prevent bus agents that are not involved in the DMA transfer from mistakenly recognizing that they are being addressed.

System Overview

FIG. 1 shows a mobile computer system 10 that may be coupled to a docking station 90. Mobile computer system 10 includes a host bridge/memory controller 20, a system I/O controller 25, an enhanced capabilities port (ECP) 30, a PC card controller 35, a graphics controller 40, a super I/O device 45, and a docking bus bridge 95, all of which are "primary bus agents" coupled to primary bus 15. When a primary bus agent has data to transfer, the primary bus agent issues a request. System I/O controller 25 includes a primary bus arbiter (as shown in FIG. 2) for determining which requesting primary bus agent is to be the "primary bus master" for a particular transaction. Various other types of primary bus agents may be coupled to primary bus 15, and mobile computer system may alternatively be a desktop computer.

Mobile computer system 10 further includes a processor 50, a cache 55, system memory 60, display device 75, and secondary bus agents 65, 70, 80, and 85. Docking station 90 is shown as including a secondary bus 100 to which a secondary bus agent 105 and an expansion bus bridge 110 are coupled as agents. The expansion bus bridge 110 is also coupled to an expansion bus 115, to which are coupled expansion bus agents 120 and 125.

Processor 50 and cache 55 are both coupled to a host bus 52, and host bridge/memory controller 20 provides a data path from the host bus 52 to the primary bus 15 and to system memory 60, which is coupled to a memory bus 62. Graphics controller 40 receives graphics information from system memory 60 via primary bus 15 for delivery to display device 75.

According to the present embodiment, primary bus 15 operates according to the PCI local bus standard (revision 1.0 or later), and each primary bus agent coupled to primary bus 15 includes a unique request signal line (REQ#) for requesting control of primary bus 15 from the primary bus arbiter. Each primary bus agent also includes a unique grant signal line (GNT#) that the primary bus arbiter uses to signal that the primary bus agent has been granted control of the primary bus. The REQ#/GNT# signal pair of each primary bus agent is coupled to the primary bus arbiter. Wherein primary bus 15 is described as operating according to the PCI Local Bus standard, the methods and apparatus described herein may be used in any bus system that provides unique request and grant signal lines for each bus agent.

Primary bus agents that may request DMA accesses are generally referred to as "DMA agents." As will be described, some primary bus agents may request access to multiple DMA channels, and such bus agents are referred to as "DMA expansion agents." DMA expansion agents are provided because primary bus agents that are coupled to the secondary bus may be coupled to multiple devices that each may request a DMA channel. In FIG. 1, each DMA agent and DMA expansion agent of primary bus 15 is labeled "DMA" in parentheses.

ECP 30, PC card controller 35, super I/O device 45, and docking bus bridge 95 are each shown as being DMA agents of primary bus 15. ECP 30 is a parallel port that directly controls a single DMA channel through its REQ#/GNT# signal pair. PC card controller 35 may be a CardBus controller or PCMCIA card controller that indirectly controls multiple DMA channels. Super I/O 45 and docking bus bridge 95 are also DMA expansion agents that may request multiple DMA channels.

Each DMA expansion agent is coupled to a secondary bus. For example, PC card controller 35 is coupled to a secondary bus 37, and super I/O 45 is coupled to secondary bus 47. When mobile computer system 10 is coupled to docking station 90, docking bus bridge 95 is coupled to secondary bus 100, which may operate according to the PCI Local Bus standard. Multiple devices may be coupled to each of the secondary buses, and each secondary bus agent may request a DMA channel. For example, secondary bus agents 65 and 70 are coupled to secondary bus 37, secondary bus agents 80 and 85 are coupled to secondary bus 47, and secondary bus agent 105 and expansion bus bridge 110 are coupled to secondary bus 100. Each of the secondary bus agents 65 and 70 coupled to secondary bus 37 may be a PC card that operates according to a PC card standard such as the PCMCIA or CardBus standards. Secondary bus 47 may operate according to the ISA or EISA bus standards, and each of the secondary bus agents 80 and 85 may be ISA or EISA I/O devices such as disk drives or input devices.

Each DMA expansion agent includes a secondary bus arbiter (as discussed with respect to FIG. 3) that receives DMA requests from secondary bus agents. The DMA expansion agent forwards received DMA requests to system I/O controller 25 by asserting its REQ# line in a manner such as that described below with respect to FIG. 6.

FIG. 2 shows system I/O controller 25 as including primary bus arbiter 130, primary bus interface logic 131, encode/decode logic 132, DMA controller 135, and buffer 137. DMA controller 135 may be alternatively located elsewhere, and DMA controller 135 is shown as being included in system I/O controller 25 to facilitate discussion of the present embodiments. Primary bus interface logic 131 and encode/decode logic 132, provide the electrical interface to primary bus 15. Signal line designations ending in a pound sign ("#") indicate a signal that is asserted by placing the signal line in a logic low state. As described above, primary bus 15 may operate according to the PCI Local Bus standard. Therefore, encode/decode logic 132 is shown as being coupled to the arbitration lines REQn# and GNTn#, and primary bus interface logic 131 is shown as being coupled to multiplexed address/data lines AD[31:0], and to primary bus control signal lines FRAME#, TRDY#, IRDY#, C/BE#[3:0]. These signals and other signals of the PCI interface are described in more detail in the PCI Local Bus standard. Each primary bus agent that is capable of being a primary bus master includes an electrical interface coupled to the same signals.

Encode/decode logic 132, which may be implemented as software or hardware, is provided to determine whether a primary bus request received via the REQn# signal lines of primary bus 15 is to be forwarded directly to primary bus arbiter 130 via local REQn# signal lines or whether the primary bus request is to be forwarded as a DMA request to DMA controller 135 via DMA request lines DREQn#. Primary bus arbiter 130 arbitrates and grants normal primary bus master requests by asserting the appropriate local GNTn# signal line, and encode/decode logic 132 asserts the corresponding GNT# signal line in the appropriate manner to indicate a grant.

DMA controller 135 arbitrates DMA requests received via the DREQn# signal lines, and asserts the HOLD signal line to indicate a DMA request is to be asserted. The HOLD signal line is coupled to primary bus arbiter 130, which asserts the HLDA signal to acknowledge assertion of the HOLD signal and to provide bus mastership to DMA controller 135. DMA controller 135 asserts the appropriate DACKn# signal line in response to receiving the HLDA signal, and encode/decode logic 132 appropriately asserts the correct GNTn# signal line.

DMA controller 135 may be implemented using the 8237 DMA controller chip sold by Intel Corporation of Santa Clara, Calif. As already has been described, the electrical interface of the 8237 chip includes multiple DMA request lines DREQn# and multiple DMA acknowledge lines DACKn#.

The electrical interface between DMA controller 135 and primary bus interface logic 131 is shown as including the control signals MRDC#, MWTC#, IORC#, IOWC#, and TC. DMA controller 135 asserts MRDC# to indicate a memory read operation; DMA controller 135 asserts MWTC# to indicate a memory write operation; DMA controller 135 asserts IORC# to indicate an I/O read command; DMA controller 135 asserts IOWC# to indicate an I/O write command; and DMA controller 135 asserts TC to indicate the last portion of data to be transferred (terminal count). For typical ISA/EISA systems, these control signals would be routed directly to the ISA/EISA bus agents or the processor. As described below, primary bus interface logic 131 responds to the assertion of the control signals by performing the primary bus transactions required to accomplish a DMA transfer. DMA controller 135 may be provided with primary bus interface logic that is distinct from the interface logic of system I/O controller 25.

DMA controller 135 may also include a set of secondary bus address lines and data lines for the case wherein the DMA controller is coupled directly to a secondary bus. For example, according to one embodiment, DMA controller 135 may be incorporated in the circuitry of super I/O device 45, which is coupled to secondary bus 47. The control signals output by DMA controller 135 may also be directly coupled to secondary bus agents. DMA controller 135 may therefore be used to directly receive and grant DMA requests of local secondary bus agents without routing local DMA requests and grants through system I/O controller 25.

As will be described, DMA read and write transfers include one or more read transactions (load) followed by one or more write transactions (store). Data buffer 137 may be provided to buffer data during DMA transfers. For example, for the case of a DMA write transfer from a primary bus agent to system memory, the data width of the primary bus agent may be less then the width of the data bus. To reduce the number of memory writes, it is desirable to perform two or more successive I/O reads to obtain enough data to fill the data bus for the memory write. For example, the data width of the primary bus agent may be only sixteen bits, wherein the data bus width is thirty-two bits. Assuming that the primary bus agent has at least thirty-two bits of data to transfer to memory, the data may be transferred by performing a first 16-bit I/O read and a first 16-bit memory write followed by a second 16-bit I/O read and a second 16-bit memory write, and no buffering is required. A more economical method of transferring thirty-two bits of data is to perform two successive 16-bit I/O reads followed by a single 32-bit memory write. During a DMA read transfer, the data of a 32-bit memory read may be buffered and sequentially outputted using successive 16-bit I/O write transactions.

Depending on the manner in which data is delivered to primary bus 15 by a primary bus agent, data buffer 137 may include logic for shifting buffered data so that it is properly aligned during the "store" portion of a DMA transfer. For example, each of the two 16-bit I/O read transactions may assert the same sixteen data lines, 0 to 15. During the 32-bit memory write transaction, all thirty-two data lines must be appropriately asserted. Therefore, the sixteen bits of data buffered for the first 15-bit I/O read transaction are shifted to bit positions 16–31, and the sixteen bits of data for the second I/O read transaction are stored in bit positions 0–15.

According to the present embodiment, a primary bus agent may request one or more DMA channels by asserting its REQ# signal in an appropriate manner, as described below. Encode/decode logic 132 is configured to recognize a DMA request and to forward DMA requests to DMA controller 135 by asserting the corresponding DMA request signal line or lines DREQ#. DMA controller 135 arbitrates DMA requests and asserts the HOLD signal. When DMA controller 135 receives the HLDA signal, it asserts the appropriate DMA acknowledge signal line DACK#. Encode/decode logic 132 detects the assertion of a DACK# signal and asserts the GNT# signal line of the primary bus agent requesting the DMA channel.

FIG. 3 shows the structure of a DMA expansion agent such as super I/O device 45. As shown, a DMA expansion agent may include a secondary arbiter 140 that is coupled to received DMA requests from secondary bus agents via local DREQ# signal lines. A DMA expansion agent may also generate normal bus master requests.

The secondary bus arbiter 140 of a DMA expansion agent does not arbitrate DMA requests received from secondary bus agents. Instead, secondary bus arbiter 140 passes DMA requests to system I/O controller 25 by appropriately asserting its REQ# signal line. When a grant is received via the GNT# signal line, the secondary arbiter 140 asserts the appropriate local DMA acknowledge line DACK#.

As will be described with respect to FIGS. 7–9, it is important for the DMA expansion agent to pass all currently active requests to the system I/O controller 25. According to the present embodiment certain rules are implemented to ensure that all active requests are serviced and that any requests previously asserted that subsequently become inactive are not serviced.

DMA Request Signaling Mechanisms And Protocols

The request/grant signal pairs of primary bus 15 may be used to request and grant DMA transfer requests. Primary bus agents arbitrate for primary bus 15 using their request/grant signal pairs, and each arbitration transaction may be divided into a request phase and a grant phase. During the request phase, a primary bus agent issues its request or requests using its request signal, and the primary bus arbiter or DMA controller arbitrates the requests. During the grant phase, the encode/decode logic passes a grant to a primary bus agent from either the primary bus arbiter or the DMA controller by asserting the appropriate grant signal line.

Different mechanisms may be used to request and grant DMA transfer requests. For example, for DMA agents that may only request a single DMA channel, encode/decode logic 132 may include a control register indicating the DMA channel that the DMA agent may request. Thus, encode/decode logic 132 recognizes a DMA request whenever the REQ# signal of that DMA agent is asserted. Alternatively, a DMA agent may indicate the DMA channel it is requesting by serially asserting and deasserting its REQ# signal in a prescribed manner within a provided window of time. If each DMA agent may request only one DMA channel, it is sufficient to encode the channel request. For example, if eight DMA channels are provided, three bus clock cycles may be provided during which time the DMA agent encodes its DMA channel request by appropriately asserting and deasserting the REQ# signal line. For DMA expansion agents that can request access to multiple DMA channels, the DMA channel request are not encoded so that multiple DMA channel requests may be passed together. For example, if eight DMA channels are provided, eight bus clock cycles that each correspond to a particular DMA channel may be provided. If the DMA expansion agent has a request for a particular DMA channel, the DMA expansion agent deasserts the REQ# signal for the corresponding clock cycle.

According to the present embodiment, encode/decode logic 132 includes a REQ#/GNT# control register for each bus agent that may be coupled to primary bus 15. Each REQ#/GNT# control register indicates whether the particular primary bus agent is a normal bus agent, a DMA agent, or a DMA expansion agent.

FIG. 4 shows a set of REQ.#/GNT# control registers 145. Each control register 145 is a 4-bit register comprising a 3-bit channel field and a 1-bit expansion field. A DMA expansion agent is signified by setting the expansion bit of a control register to a logic one value. When the expansion bit is set to a logic zero, the channel field signifies which of eight "channels"—seven DMA channels and one bus master "channel"—is controlled by the primary bus agent. If the primary bus agent is assigned a bus master channel, the primary bus agent is a normal bus agent and does not request DMA accesses.

When the REQ# of a primary bus agent is asserted, encode/decode logic 132 scans the contents of the corresponding control register 145. If the control register 145 indicates that the primary bus agent is requesting access as a primary bus master, encode/decode logic 132 arbitrates the request normally. If the control register 145 indicates that the primary bus agent is a DMA agent, encode/decode logic 132 passes the request to DMA controller 135, which arbitrates DMA requests.

FIG. 5 shows one possible decoding for the contents of control registers 145. When the expansion bit is at a logic low level, the three bits of the channel field indicate the primary bus agent as being either a DMA agent or a normal bus agent. For example, if the binary value of the channel field is "001," the bus agent that is coupled to the corresponding REQ#/GNT# signal pair is a DMA agent that requests DMA channel 1. If the binary value of the channel field is "100," the bus agent that is coupled to the corresponding REQ#/GNT# signal pair is a normal bus master that requests a normal bus master access.

If the expansion bit is at a logic high level, the primary bus agent is a DMA expansion agent, and the bits of the channel field are "don't cares." The DMA expansion agent may request multiple DMA channels and normal bus master access by asserting its REQ# signal line according to a serial channel passing protocol such as that described with respect to FIG. 6.

FIG. 6 is a timing diagram showing one serial channel passing protocol wherein a DMA expansion agent uses its REQ# signal 602 line to pass multiple DMA requests to encode/decode logic 132 during a single request phase of an arbitration transaction. The serial channel passing protocol shown in FIG. 6 enables a DMA expansion agent to request multiple DMA channels in a single request phase by serially toggling the REQ# line. As shown, nine clock cycles of a clock signal 600 are provided to serially pass multiple channel requests by a DMA expansion agent. A clock cycle is provided for each of the eight channels that may be requested, wherein the channel decode is that described with respect to FIG. 5.

Upon the start of a serial channel request, the REQ# signal is asserted active low for one full clock cycle. After the first clock cycle there is a single clock cycle devoted to each channel that may be requested. More or fewer clock cycles may be required, depending on the number of DMA channels implemented by a computer system. If the DMA expansion agent has an active request for a DMA channel, the DMA expansion agent deasserts the REQ# signal during the dock cycle associated with the DMA channel having the request. If a DMA expansion agent has multiple active DMA requests, the DMA expansion agent deasserts the REQ# signal during each corresponding clock cycle. If a DMA expansion agent is requesting access as a primary bus master, the DMA expansion agent deasserts the REQ# signal during the dock cycle corresponding to channel 4. The REQ# of the requesting DMA expansion agent remains asserted while the DMA expansion agent has a pending request.

Encode/decode logic 132 responds to the serially received request or requests by passing on the DMA channel requests to DMA controller 135 and by passing normal bus master requests to primary bus arbiter 130 for normal arbitration for a bus master request. Encode/decode logic 132 passes DMA requests to DMA controller 135 by asserting the DREQ# signal of each requested DMA channel. DMA controller 135 arbitrates the DMA requests and grants a DMA request by asserting the HOLD signal and the appropriate DACK# signal. Encode/decode logic 132 passes the grant of the DMA request to the appropriate DMA expansion agent by encoding the number of the granted channel on the GNT# signal 604 line as shown in FIG. 6. Four clock cycles are therefore used to serially provide a grant to the requesting DMA expansion agent. After the first clock cycle, each of the three subsequent clock cycles corresponds to a bit of the channel field, indicating which of the eight channels has been granted to the DMA expansion agents.

Each requesting secondary DMA bus agent is typically provided with a time-out mechanism that specifies a maximum amount of time is allowed for a DMA request to complete. The time-out timer begins as soon as the secondary bus agent makes the request, and it is imperative to provide each DMA request to the DMA controller as soon as possible. Therefore, all active requests of a DMA expansion agent should be sent together, if possible. Sometimes, however, a request may become active after a request has already been passed to encode/decode logic 132. Similarly, a request may go inactive after it has already been passed to encode/decode logic 132.

The present embodiment implements a protocol regarding the handling of multiple active requests by DMA expansion agents. The rules of the protocol may be synopsized as follows:

1) a DMA expansion agent having an outstanding request (wherein REQ# is asserted and a grant has not been received) drives its REQ# signal line inactive for one clock cycle to signal new request information; and 2) a DMA expansion agent, upon completing one of multiple active requests, drives its REQ# signal line inactive for two clock cycles before signaling its remaining requests.

The rules implemented by the present embodiment presume that the REQ# and GNT# state machines of each primary bus agent run independently and concurrently such that grants can be received while requests are made, and vice versa. The rules practiced by the present embodiment are chosen for the specific implementation, and are not exhaustive of the ways in which the situations described below with respect to FIG. 7–9 may be processed by a DMA expansion agent.

FIG. 7 is a flow chart showing a general process for the handling of multiple active requests by a DMA expansion agent. At process block 700, a DMA expansion agent such as super I/O device 45 signals that it has multiple active requests using the serial signal and protocol shown in FIG. 6. For example, the DMA expansion agent may have active requests for channel 1 (DMA channel 1) and for channel 4 (a normal bus master access). At process block 705, encode/decode logic 132 provides a grant of one of the requests, as shown in FIG. 6, in response to DMA controller 135. For example, primary arbiter 130 grants the DMA expansion agent's request for channel 4 (normal bus master), and encode/decode logic 132 passes the grant. The first transaction completes at process block 710, at which time the DMA expansion agent still has an active request for channel 1.

According to the present embodiment, a DMA expansion agent must signal its remaining active requests after a first request is serviced. At process block 715, the DMA expansion agent deasserts its REQ# signal for two clock cycles prior to signaling its remaining request. At process block 720, the PCI DMA expansion agent asserts its REQ# signal according to the serial channel passing protocol to request any remaining active transactions. The request is granted at process block 725, and the transaction completes at process block 730. If at process block 735 the DMA expansion agent still has outstanding active requests from its DMA agents, process block 715–730 are repeated until no active requests remain, at which time the process ends at process block 740.

FIG. 8 is a flow chart showing a process for handling a situation wherein a DMA expansion agent that has signaled multiple requests to system I/O controller 25 has one of the requests go inactive prior to receiving a grant signal for any of the active requests. At process block 800, the DMA expansion agent signals that it has multiple active requests by toggling its REQ# signal line as shown in FIG. 6. At process block 805, prior to receiving a grant, the request of a first secondary bus agent goes inactive. At process block 810, the DMA expansion agent drives its REQ# signal line inactive for one clock cycle. At process block 815, the DMA expansion agent signals its remaining active request or requests using the serial channel passing protocol shown in FIG. 6. The process ends at process block 820.

For example, if a DMA expansion agent has active requests for channels 1 and 2, the DMA expansion agent signals both requests as active using the serial channel passing protocol. If the request for channel 1 goes inactive prior to the DMA expansion agent receiving an encoded GNT# signal from encode/decode logic 132, the DMA expansion agent deasserts its REQ# signal for one clock cycle and then transmits its request for channel 2 using the serial channel passing protocol.

FIG. 9 is a flow chart showing a process for handling a situation wherein a DMA expansion agent having an outstanding request receives a new active request before receiving a grant from the system I/O controller. At process block 900, the DMA expansion agent signals that it has one or more requests. At process block 905, prior to the receipt of a grant signal, the DMA expansion agent detects a new active request. At process block 910, the DMA expansion agent drives its REQ# signal line inactive for one clock cycle, and the PCI DMA expansion agent signals all of its active requests using the serial channel passing protocol at process block 915. The process ends at process block 920.

FIG. 10 shows an alternative serial channel passing protocol wherein each primary bus agent may only request access to a single channel. Therefore, each DMA agent may only request access to one DMA channel As shown, a requesting agent requests an access by encoding a channel request over four bus cycles. After the first bus cycle, three bus cycles are provided wherein the requesting primary bus agent asserts or deasserts its REQ# signal 602 during each bus cycle to encode the channel request. After the fourth bus cycle, the REQ# signal 602, of the requesting agent remains asserted as long as the request remains active. A request is granted by merely asserting the appropriate GNT# signal. The decoding of the channel request may be that shown in FIG. 5. The encoded serial channel passing protocol may be used by all primary bus agents, obviating the need for the REQ#/GNT# control registers shown in FIG. 4. One disadvantage of this alternative method is that it does not provide for DMA agents that request multiple channels.

DMA CYCLE PROTOCOLS

Once a DMA request is granted, DMA controller 135 controls the DMA transfer. Thus, the requesting primary bus agent that has received the grant is not actually grated control of the primary bus as a bus master. DMA controller 135 supports DMA read transfers (memory to I/O), DMA write transfers (I/O to memory), and DMA verify transfers. DMA controller 135 also supports ISA master cycles. Each DMA read or write transfer is a two phase transfer including an I/O phase and a memory phase. During the I/O phase, DMA controller 135 causes data to be read from or written to a bus agent. During the memory phase, DMA controller 135 causes data to be written to or read from system memory. The order in which the I/O and memory phases are performed is determined by the type of DMA transfer. A DMA verify transfer includes only an I/O phase comprising an I/O read transaction.

The precise manner in which DMA transfers are performed is determined by the transfer mode used by DMA controller 135. DMA controller 135 supports the single transfer mode, the block transfer mode, the demand transfer mode, and the cascade mode specified by the ISA system architecture. Wherein DMA controller 135 implements ISA/EISA DMA protocols, other DMA protocols may be used depending on the bus architectures implemented by the secondary buses.

According to the single transfer mode, DMA controller 135 relinquishes control of primary bus 15 after each byte, word, or double word is transferred so that the processor 50 may have access to primary bus 15 on a regular basis. The single transfer mode is implicitly supported when a DMA agent immediately deasserts its REQ# signal after every transfer, or when DMA controller 135 deasserts the appropriate DACK# signal after every transfer such that primary bus 130 deasserts the GNT# signal of the DMA agent. A DMA agent may deassert its REQ# signal in response to the requesting secondary bus agent deasserting its DREQ# signal or in response to detecting deassertion of the GNT# signal line.

According to the block transfer mode, a block of data of any size is transferred by DMA controller 135 performing multiple successive DMA transfers. The block transfer mode may be implemented so long as primary bus arbiter 130 does not include a time-out mechanism that specifies a maximum time that a primary bus agent can own the primary bus. According the demand transfer mode, DMA controller 135 performs successive DMA transfers as long as the granted DMA agent asserts its REQ# signal line. To signal that the DMA agent can no longer supply or accept data, the DMA agent or DMA expansion agent must deassert its REQ# signal line for two clock cycles.

Both the I/O phase and the memory phase of a DMA transfer are performed by primary bus interface logic 131 using normal primary bus read and write transactions in response to DMA controller 135. When primary bus 15 is a PCI Local Bus, a DMA read transfer may include a PCI memory read transaction for the memory phase followed by a PCI I/O write transaction for the I/O phase. A DMA write transfer may include two 16-bit PCI I/O read transactions for the I/O phase followed by a single 32-bit memory read transaction for the memory phase. FIG. 11 shows a normal PCI read transaction, and FIG. 12 shows a normal PCI write transaction.

For both PCI read and write transactions, multiplexed command/byte enable signal lines C/BE#[3:0] 1106 are used to indicate the PCI bus command (e.g., I/O read, I/O write, memory read, and memory write) during one portion of a given transaction and to indicate the byte lanes for data during a subsequent portion of the transaction. Similarly, multiplexed address and data lines AD[31:0] 1104 are used to communicate the address to be accessed by the transaction during one portion of the transaction and to carry the data for the transaction during subsequent portions of the transaction. According to the present embodiment, the GNT# signal of the DMA agent must remain asserted until the last data phase of the I/O phase of the DMA transfer.

As described above, the electrical interface between DMA controller 135 and primary bus interface logic 131 includes several signals that are normally coupled directly to requesting I/O devices, and many of these signals indicate the type of DMA cycle that is to occur. For example, the terminal count TC signal indicates whether the current data is the last data of a block. A mechanism should be provided to "pass" pertinent DMA control signals to DMA agents.

According to the present embodiment, primary bus interface logic 131 uses the address lines of the primary bus during the address portion of a primary bus transaction to pass DMA control information to a DMA agent. The address lines of the primary bus are not required to pass a valid address during the I/O portion of a DMA transfer because a DMA agent also receives a grant signal that selects the DMA agent. Control information is passed by setting the address lines to one of a plurality of values that correspond to the address space of DMA controller 135. The DMA agent that detects an active grant signal decodes the value of the address lines to determine the control information. To properly recognize the initiation of the I/O portion of the DMA cycle, every DMA agent and DMA expansion agent must recognize the assertion of its corresponding GNT# signal combined with the receipt of encoded DMA control information as its command authorization to initiate a DMA access cycle.

The control information passed by primary bus interface logic 131 includes information regarding whether a particular DMA cycle is a normal read or write cycle, a verify cycle, or a terminal count cycle. FIG. 13 shows an exemplary decoding of address line values to control information wherein the address values are selected to correspond to the address space of DMA controller 135 such that no conflicts with other devices can occur. A normal I/O read or write cycle is signaled by indicating a normal PCI I/O read or write transaction as the bus command and setting the address to a value of 00h. A terminal count I/O read or write cycle is signaled by indicating a normal PCI I/O read or write transaction as the bus command and setting the address to a value of 04h. A verify operation is signaled by indicating a normal I/O read operation as the bus command and setting the address to a value of 0C0h. A verify with terminal count is signaled by indicating a normal PCI I/0 read transaction and setting the address to a value of 0C4h.

According to the PCI Local Bus standard, all PCI agents are double word aligned and therefore are connected to all of the multiplexed address and data lines AD[31:0]. The byte enable lines BE#are used to indicate which bytes of the multiplexed address and data lines AD[31:0] carry meaningful data during the data phase of a bus transaction. According to the present embodiment, DMA agents of the primary bus may be byte wide, word wide, or double word wide. FIG. 14 shows a possible alignment of DMA agents with respect to the multiplexed address and data lines AD[31:0]. FIG. 14 shows that a DMA agent that is a byte wide is coupled to AD[7:0], a DMA agent that is a word wide is coupled to AD[15:0], and a DMA agent that is double-word wide is coupled to AD[31:0]. FIG. 15 shows a decoding of the byte enable lines BE#[3:0] that corresponds to the alignment of DMA agents shown in FIG. 14. The byte enable lines BE#[3:0] are asserted as shown in FIG. 15 during the I/O phase of a DMA transfer according to the data width of the DMA agent.

FIG. 16 shows an exemplary DMA write transfer according to a one embodiment. The timing diagram is not to scale. As shown, a DMA expansion agent signals a request using a serial channel passing protocol, and encode/decode logic 132 of system I/O controller 25 responds with a serial grant. The requested DMA transfer is a DMA write transfer, and the DMA expansion agent is a 16-bit wide device. To perform a 32-bit write to memory, two 16-bit I/O reads are performed during the I/O phase of the DMA transfer, and a single 32-bit memory write is performed during the memory phase of the DMA transfer.

As shown, the first 16-bit I/O read occurs after the grant is received. During each of the 16-bit I/O read transactions, the address and data lines AD[31:0] 1606 initially carry an encoded control information value of "00h," which indicates a normal DMA I/O operation. While the address and data lines carry the encoded control information, the command and byte enable lines C/BE#[3:0] 1608 carry a bus command value of "00h," which indicates an I/O read. Therefore, a normal I/O read of the DMA expansion agent is to occur. The command and byte enable lines C/BE#[3:0] subsequently carry a value of "0Ch," which indicates that address and data lines [0:15] carry valid data. The sixteen bits of the first I/O read transaction are stored in buffer 137 in bit positions 0 to 15. The sixteen bits of the second I/O read transaction are conveyed using address and data lines AD[15:0], but are stored in bit positions 16 to 31. During the 32-bit memory write operation, the contents of buffer 137 are placed on the address and data lines AD[31:0], and all byte lanes are enabled. Thus, a 32-bit DMA write transfer may be accomplished.

In the foregoing specification the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A computer system comprising:

a bus;

a system I/O controller coupled to the bus;

a direct memory access (DMA) controller coupled to the system I/O controller;

a plurality n of bus agents coupled to the bus; and a plurality n of request signal lines and a plurality n of grant signal lines for transmitting requests and grants respectively between the bus agents and the system I/O controller, each request signal line and each grant signal line being coupled between an associated bus agent and the system I/O controller, wherein the system I/O controller comprises:

encode/decode logic coupled to the request signal lines; and a bus arbiter coupled to the encode/decode logic, wherein the encode/decode logic passes bus requests to the bus arbiter and passes DMA requests to the DMA controller, and wherein the DMA controller issues a grant of a DMA request, by a requesting bus agent, to the encode/decode logic, and the encode/decode logic passes the grant of the DMA request to the requesting bus agent using the grant signal line coupled to the requesting bus agent.

2. The computer system of claim 1, wherein the encode/decode logic includes a plurality of control registers, each control register corresponding to one of the plurality of request signal lines, each control register storing channel information specifying at least one channel for each bus agent.

3. The computer of claim 2, wherein the encode/decode logic checks the contents of a particular control register to determine whether a particular bus agent is requesting a DMA transfer request in response to the encode/decode logic detecting assertion of the request signal line of the particular bus agent, the encode/decode logic determining that the particular bus agent is a DMA agent if the channel information of the particular control register specifies at least one DMA channel, the encode/decode logic determining that the particular bus agent is a normal bus agent if the channel information of the particular control register specifies a normal bus master.

4. The computer system of claim 1, wherein the requesting bus agent issues the DMA request by serially toggling the request signal line coupled to the requesting bus agent.

5. The computer system of claim 1, wherein the requesting bus agent issues multiple requests in a single request phase by serially toggling the request signal line, coupled to the requesting bus agent, to indicate at least two requested channels.

6. The computer system of claim 5, wherein the encode/decode logic passes a grant of one of the multiple requests to the requesting bus agent by serially toggling the grant signal line coupled to the requesting bus agent.

7. A computer system comprising:

a bus;

a system I/O controller coupled to the bus;

a bus agent coupled to the bus;

a first request signal line coupled between the bus agent and the system I/O controller, the bus agent configured to use the first request signal line to issue bus master requests;

a first grant signal line coupled between the system I/O controller and the bus agent, the system I/O controller configured to use the first grant signal line to indicate grants of bus master requests;

a direct memory access (DMA) agent;

a second request signal line coupled between the DMA agent and the system I/O controller, the DMA agent configured to use the second request signal line to issue DMA requests;

a second grant signal line coupled between the system I/O controller and the DMA agent, the system I/O controller configured to use the second grant signal line to indicate grants of DMA requests; and a DMA controller coupled to the system I/O controller, wherein the system I/O controller passes DMA requests to the DMA controller and arbitrates bus master requests, and wherein the DMA controller issues grants of DMA requests to the system I/O controller.

8. The computer system of claim 7, wherein the system I/O controller comprises:

a first control register corresponding to the bus agent, the first control register storing channel information specifying that the bus agent issues bus master requests; and a second control register corresponding to the DMA agent, the second control register storing channel information specifying a single DMA channel for the DMA agent.

9. The computer system of claim 8, wherein the DMA agent issues a first DMA request by asserting the second request signal line and wherein the system I/O controller passes a first grant of the first DMA request by asserting the second grant signal line.

10. The computer system of claim 7, wherein the system I/O controller comprises:

a first control register corresponding to the bus agent, the first control register storing channel information specifying that the bus agent issues bus master requests; and a second control register corresponding to the DMA agent, the second control register storing channel information specifying that the DMA agent can request access to a plurality, of channels.

11. The computer system of claim 10, wherein the DMA agent requests access to a plurality of channels during a single request phase by toggling the second request signal line.

12. The computer system of claim 11, wherein the system I/O controller passes a grant for one of the the plurality of channels to the DMA agent by toggling the second grant signal line.

13. In a computer system comprising a bus and supporting a DMA channel and a bus master channel, a bus arbitration method comprising the steps of:

a direct memory access (DMA) agent coupled to the bus serially asserting and deasserting a request signal line, dedicated to the DMA agent, to indicate a requested channel as being either the DMA channel or the bus master channel;

a system I/O controller coupled to the request signal line detecting the asserting and deasserting of the request signal line by the DMA agent;

the system I/O controller passing a DMA request to a DMA controller if the requested channel is the DMA channel; and the system I/O controller arbitrating a bus request if the requested channel is the bus master channel.

14. The bus arbitration method of claim 13, comprising the further step of:

the system I/O controller granting the requested channel by toggling a grant signal line coupled to the DMA agent to encode a channel number of the requested channel.

15. A bus arbitration method comprising the steps of:

a bus agent using a request signal line to issue at least one channel request during a request phase of an arbitration transaction;

a system I/O controller coupled to the request signal line checking channel information of the bus agent stored in a control register, the channel information specifying at least one channel that the bus agent may request;

the system I/O controller arbitrating the channel request if the channel information of the bus agent specifies that the requested channel is a bus master channel and if the bus agent is capable of issuing only one channel request during the request phase; and the system I/O controller passing the channel request to a direct memory access (DMA) controller if the channel information of the bus agent specifies that the requested channel is a DMA channel and if the bus agent is capable of issuing only one channel request during the request phase, the DMA controller arbitrating the channel request.

16. The bus arbitration method of claim 15, comprising the further step of the system I/O controller granting the channel request when the requested channel is a bus master channel by asserting a grant signal line coupled to the bus agent.

17. The bus arbitration method of claim 15, comprising the further steps of:

the DMA controller issuing a grant of a DMA channel to the system I/O controller; and the system I/O controller granting the channel request by asserting a grant signal line coupled to the bus agent.

18. The bus arbitration method of claim 15, wherein the bus agent issues a single channel request during the request phase, the step of the bus agent using the request signal comprising the step of the bus agent asserting the request signal line.

19. The bus arbitration method of claim 15, wherein the bus agent is capable of issuing a plurality of channel requests during the request phase of the arbitration transaction, the bus arbitration method further comprising the steps of:

the system I/O controller identifying each requested channel;

the system I/O controller arbitrating a first channel request of the plurality of channel requests if the requested channel of the first channel request is a bus master channel; and the system I/O controller passing the first channel request to the direct memory access (DMA) controller if the requested channel of the first channel request requested is a DMA channel, the DMA controller arbitrating the channel request.

20. A computer system comprising:

a Peripheral Component Interconnect (PCI) bus;

a bus agent, coupled to the PCI bus;

a dedicated request signal line and a dedicated grant signal line, each coupled to the bus agent, the bus agent being configured to issue an access request over the dedicated request signal line, and to receive an access grant over the dedicated grant signal line;

a bus master arbiter, coupled to the PCI bus;

a Direct Memory Access (DMA) controller, coupled to the PCI Bus; and logic circuitry coupled to the dedicated request signal line, and being configured to receive an access request, for access to a DMA channel or a bus master channel, from the bus agent, and to issue grant of the access request over the dedicated grant signal line to the bus agent, wherein the logic circuitry is configured to propagate an access request for access to the bus master channel to the bus master arbiter, and to propagate an access request for access to the DMA channel to the DMA controller.

21. The computer system of claim 20 including a control register, coupled to the logic circuitry and associated with the dedicated request line, the control register storing information identifying an access request from the bus agent as being an access request for access to the DMA channel or the bus master channel.

* * * * *

UNITED STATES PATENT AND TRADEMARK OFFICE
CERTIFICATE OF CORRECTION

PATENT NO. : 5,664,197
DATED : September 2, 1997
INVENTOR(S) : Kardach et al.

It is certified that error appears in the above-identified patent and that said Letters Patent is hereby corrected as shown below:

In column 8 at line 36 delete "dock" and insert --clock--

IIn column 8 at line 42 delete "dock" and insert --clock--

In column 10 at line 47 delete "grated" and insert --granted--

Signed and Sealed this

Seventeenth Day of March, 1998

*Attest:*

BRUCE LEHMAN

*Attesting Officer*           Commissioner of Patents and Trademarks